(12) United States Patent
Yang et al.

(10) Patent No.: US 11,828,674 B2
(45) Date of Patent: Nov. 28, 2023

(54) DEVICE AND METHOD FOR CALIBRATING LENS DISTORTION CENTER

(71) Applicant: SUZHOU AVIEW IMAGE TECHNOLOGY CO., LTD., Suzhou (CN)

(72) Inventors: Chenglin Yang, Suzhou (CN); Hongxin He, Suzhou (CN); Fang Zhao, Suzhou (CN)

(73) Assignee: SUZHOU AVIEW IMAGE TECHNOLOGY CO., LTD., Suzhou (CN)

( * ) Notice: Subject to any disclaimer, the term of this patent is extended or adjusted under 35 U.S.C. 154(b) by 381 days.

(21) Appl. No.: 17/297,175

(22) PCT Filed: Nov. 26, 2019

(86) PCT No.: PCT/CN2019/120837
§ 371 (c)(1),
(2) Date: May 26, 2021

(87) PCT Pub. No.: WO2020/125336
PCT Pub. Date: Jun. 25, 2020

(65) Prior Publication Data
US 2022/0028044 A1    Jan. 27, 2022

(30) Foreign Application Priority Data
Dec. 18, 2018 (CN) .......................... 201811549243.5

(51) Int. Cl.
*G06T 7/80* (2017.01)
*G03B 13/00* (2021.01)
(Continued)

(52) U.S. Cl.
CPC ......... *G01M 11/0214* (2013.01); *G02B 27/62* (2013.01); *G03B 43/00* (2013.01); *G06T 7/80* (2017.01)

(58) Field of Classification Search
CPC ... G02B 27/62; G03B 43/00; G01M 11/0214; G06T 7/80
See application file for complete search history.

(56) References Cited

U.S. PATENT DOCUMENTS

2012/0169885 A1    7/2012    Wang et al.

FOREIGN PATENT DOCUMENTS

| CN | 105654502 A | 6/2016 |
|---|---|---|
| CN | 106846415 A | 6/2017 |

(Continued)

*Primary Examiner* — Tarifur R Chowdhury
*Assistant Examiner* — Amanda Merlino
(74) *Attorney, Agent, or Firm* — SZDC LAW P.C.

(57) ABSTRACT

The invention provides a device and method for calibrating a lens distortion center. The device includes a rotating frame, a first driving mechanism and a second driving mechanism. The first driving mechanism is connected with the rotating frame for driving the rotating frame to rotate. A calibration plate is arranged in the rotating frame and connected with the rotating frame through a rotating shaft. The second driving mechanism is connected with the calibration plate for driving the calibration plate to rotate relative to the rotating frame, and a lens placement platform is provided at a front end of the calibration plate. The device of the invention can adjust the relative position between the calibration plate and the lens through the cooperation of the first driving mechanism with the second driving mechanism, so that a lens can acquire different images to achieve calibration of lens distortion.

9 Claims, 3 Drawing Sheets

(51) Int. Cl.
*G01M 11/02* (2006.01)
*G02B 27/06* (2006.01)
*G03B 43/00* (2021.01)
*G02B 27/62* (2006.01)

(56) References Cited

FOREIGN PATENT DOCUMENTS

| | | |
|---|---|---|
| CN | 109448063 A | 3/2019 |
| CN | 209000071 U | 6/2019 |

DEVICE AND METHOD FOR CALIBRATING LENS DISTORTION CENTER

This application is the National Stage Application of PCT/CN2019/120837, filed on Nov. 26, 2019, which claims priority to Chinese Patent Application No. 201811549243.5, filed on Dec. 18, 2018, which is incorporated by reference for all purposes as if fully set forth herein.

FIELD OF THE INVENTION

The present invention relates to the field of calibration devices for visual-measurement imaging systems, and more particularly to device and method for calibrating a lens distortion center.

DESCRIPTION OF THE RELATED ART

Most of image acquisition systems use lenses. Because of the angular inclination between a lens and a sensor during assembly, a lens distortion center cannot coincide with a sensor center, and the position of the distortion center cannot be determined, which is not conducive to the post-processing of images, so the distortion center needs to be calibrated.

At present, the principles and methods for calibrating a lens distortion center in the industry are mostly based on "Zhang Zhengyou Calibration," which refers to a camera calibration method for single-plane checkerboard proposed by Professor Zhang Zhengyou in 1998. This method requires a checkerboard calibration plate, and three different photos are obtained by changing the relative position between the camera and checkerboard calibration plate, such that the lens distortion center can be calculated by matlab or opencv. Currently most of the calibrations are achieved by adjusting the checkerboard calibration plate manually, which has heavy workload, low efficiency and poor stability of calibration results.

SUMMARY OF THE INVENTION

In view of the shortcomings of the prior art, an object of the present invention is to provide a device for calibrating a lens distortion center with safety, reliability and strong stability, and the device adopts the following technical solutions.

The invention provides a device for calibrating a lens distortion center, including a rotating frame, a first driving mechanism, and a second driving mechanism. The first driving mechanism is connected with the rotating frame, and used for driving the rotating frame to rotate. A calibration plate is arranged in the rotating frame, and connected with the rotating frame through a rotating shaft. The second driving mechanism is connected with the calibration plate, and used for driving the calibration plate to rotate relative to the rotating frame; and a lens placement platform is arranged at a front end of the calibration plate for placing a lens.

In a preferable embodiment, an arc-shaped guide rail is arranged at the bottom of the rotating frame, and the arc-shaped guide rail is slidably connected with the bottom of the rotating frame, the center of the arc-shaped guide rail and the rotating shaft of the rotating frame are collinear, and the first driving mechanism is used for driving the rotating frame to rotate on the arc-shaped guide rail.

In a preferable embodiment, the calibration plate includes a checkerboard layer, AR glass and a light source panel, the AR glass is fixed on the light source panel, and the checkerboard layer is laminated on the AR glass.

In a preferable embodiment, a double-sided adhesive is arranged between the checkerboard layer and the AR glass.

In a preferable embodiment, the AR glass includes tempered glass and an AR film plated on the tempered glass.

In a preferable embodiment, the device further includes a lifting mechanism for adjusting the height of the lens placement platform.

In a preferable embodiment, the lifting mechanism includes a sleeve, a screw rod and a handwheel, both the sleeve and the screw rod are extended through the lens placement platform in a vertical direction, the handwheel is connected with the screw rod and drives the screw rod to rotate, and the screw rod is used for adjusting the height of the lens placement platform.

In a preferable embodiment, a slide base is arranged at the bottom of the lens placement platform for adjusting the distance between the lens placement platform and the calibration plate.

In a preferable embodiment, the first driving mechanism and the second driving mechanism each comprises a rotating motor.

Another object of the present invention is to provide a method for calibrating a lens distortion center with safety, reliability and strong stability, which adopts the following technical solution.

The invention provides a method for calibrating a lens distortion center, which is applied to the aforementioned calibration device, including steps of:
  placing a device for calibrating a lens distortion center in a darkroom, and placing a lens to be tested on a lens placement platform;
  adjusting the relative position of a calibration plate and the lens to be tested through a first driving mechanism and a second driving mechanism, and controlling the lens to be tested to take an image; and
  calculating the distortion center of the lens to be tested according to the image.

As compared with the prior art, the present invention has the following beneficial effects:

In the lens distortion center calibration device of the present invention, the rotating frame is driven to rotate through the first driving mechanism, the calibration plate is arranged in the rotating frame and connected with the rotating frame through the rotating shaft, the second driving mechanism is provided for driving the calibration plate to rotate relative to the rotating frame, and the lens placement platform is arranged at the front end of the calibration plate. The relative position between the calibration plate and the lens can be adjusted through the cooperation of the first driving mechanism and the second driving mechanism, so that a lens can acquire different images to achieve calibration of lens distortion.

The above description is only an overview of the technical solution of the present invention. In order to better understand the technical means of the present invention and thus implement them according to the contents of the specification, and in order to make the above and other objectives, features and advantages of the present invention more obvious and understandable, detailed description of a preferred embodiment is made hereafter with reference to the accompanying drawings.

Figure 1:
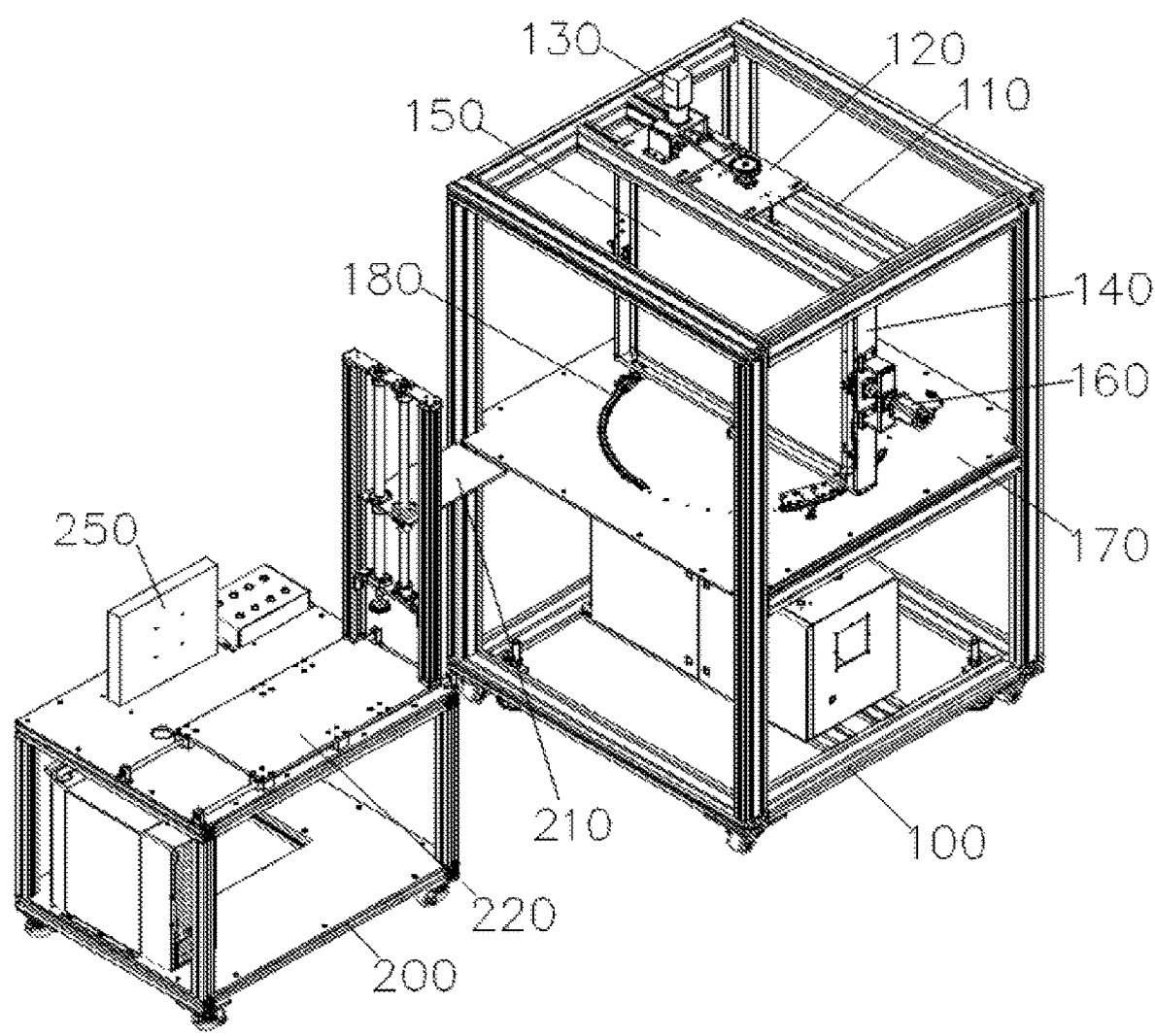
FIG. 1 is a schematic diagram of the overall structure of the device for calibrating a lens distortion center in an embodiment of the present invention.

Reference numerals: 100. first rack; 110. beam; 120. mounting base; 130. first driving mechanism; 140. rotating frame; 150. calibration plate; 160. second driving mechanism; 170. working table; 180. arc-shaped guide rail; 200. second rack; 210. lens placement platform; 220. slide base; 231. upper mounting plate; 232. lower mounting plate; 233. screw rod; 234, sleeve; 235. handwheel; 240. computer; and 250. display.

DETAILED DESCRIPTION OF THE PREFERRED EMBODIMENTS

The present invention will be further illustrated hereafter in combination with accompanying drawings and specific examples, so that those skilled in the art can better understand and implement the present invention, but the described examples are not intended to limit of the present invention.

Figure 2:
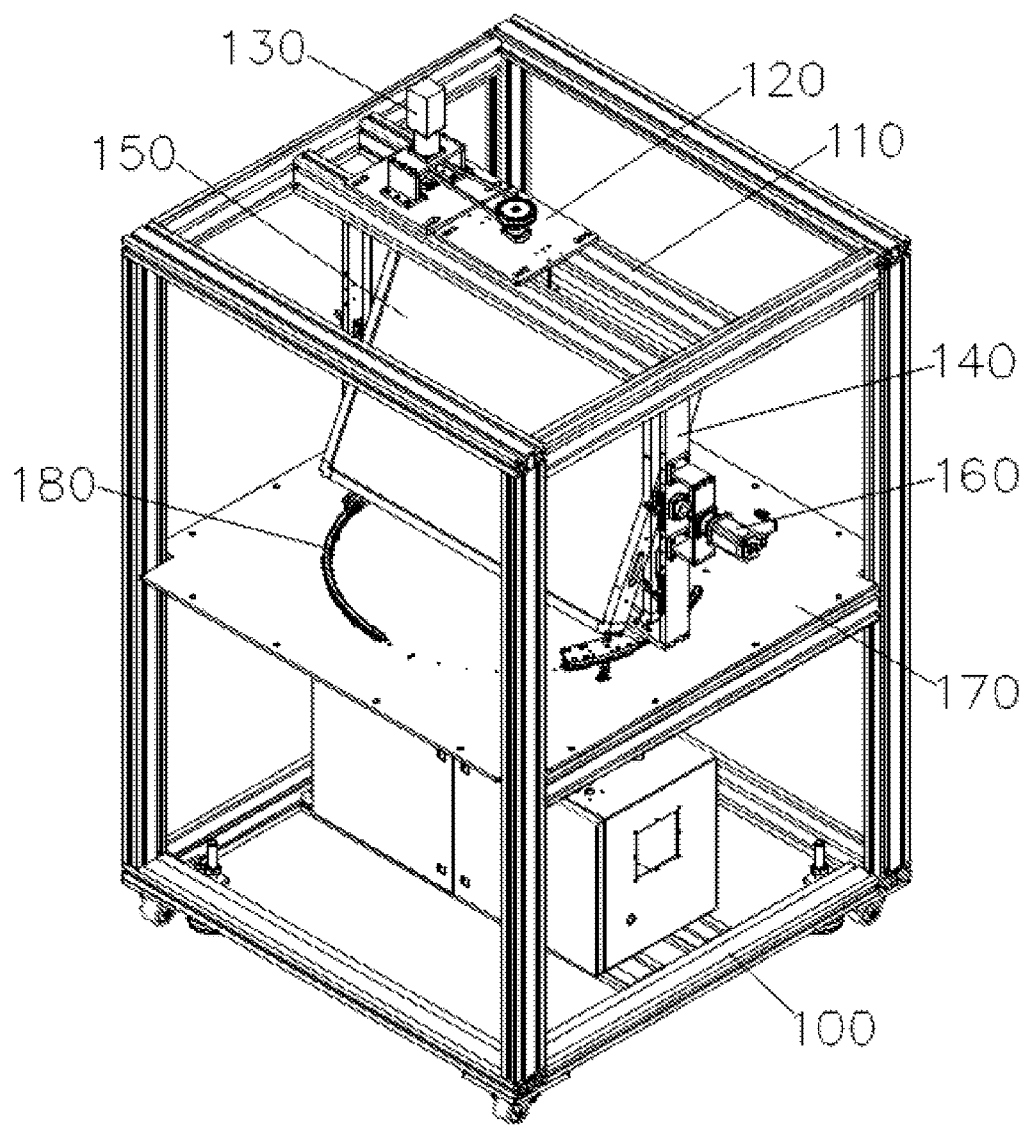
FIG. 2 is a first schematic diagram of partial structure of the device for calibrating a lens distortion center in the embodiment of the present invention.
Figure 3:
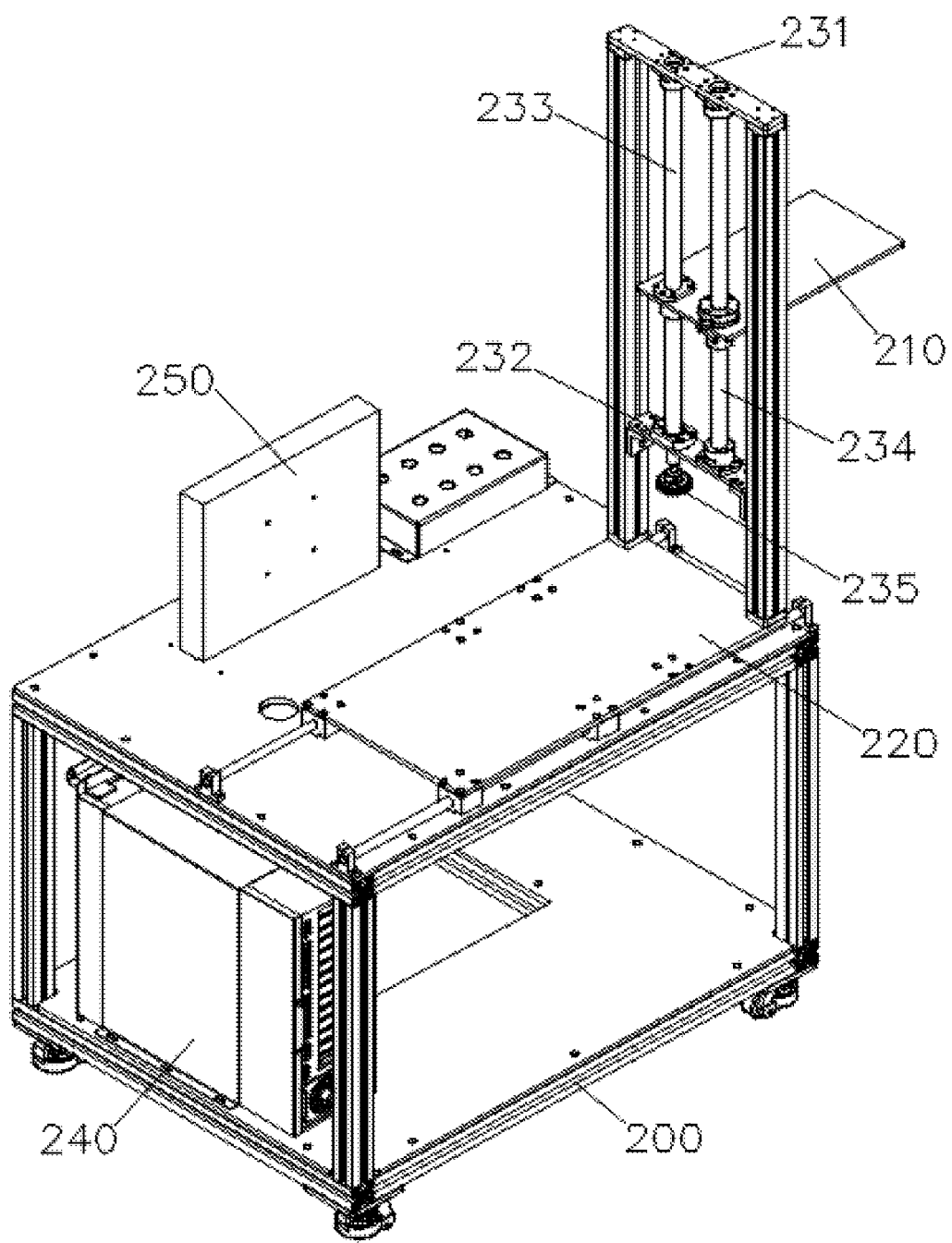
FIG. 3 is a second schematic diagram of partial structure of the device for calibrating a lens distortion center in the embodiment of the present invention.

The device for calibrating a lens distortion center of this example is as shown in FIGS. 1-3. The device includes a rotating frame 140, a first driving mechanism 130, and a second driving mechanism 160. The first driving mechanism 130 is connected with the rotating frame 140 for driving the rotating frame 140 to rotate. A calibration plate 150 is arranged in the rotating frame 140, and connected with the rotating frame 140 through a rotating shaft. The second driving mechanism 160 is connected with the calibration plate 150 for driving the calibration plate 150 to rotate relative to the rotating frame 140. A lens placement platform 210 is arranged at a front end of the calibration plate 150 for placing a lens. In this example, the first driving mechanism 130 and the second driving mechanism 160 each includes a rotating motor.

The device for calibrating a lens distortion center further includes a first rack 100, a beam 110 is arranged on the first rack 100, a mounting base 120 is fixed on the beam 110, and the first driving mechanism 130 is fixedly connected with the mounting base 120.

Preferably, an arc-shaped guide rail 180 is arranged at the bottom of the rotating frame 140, and the arc-shaped guide rail 180 is slidably connected with the bottom of the rotating frame 140, and the center of the arc-shaped guide rail 180 and the rotating shaft of the rotating frame 140 are collinear. The first driving mechanism 130 is used for driving the rotating frame to rotate on the arc-shaped guide rail 180, i.e., to rotate along a vertical direction. As such, the stability of the rotating frame 140 during rotation can be increased.

In this example, the calibration plate 150 includes a checkerboard layer, AR glass and a light source panel. The AR glass is fixed on the light source panel. The checkerboard layer is pressed on the AR glass by employing a 3M double-sided adhesive to ensure the flatness of the checkerboard layer. The AR glass includes tempered glass and a AR film plated on the tempered glass, which functions to increase transmittance and reduce reflectivity.

The device for calibrating a lens distortion center further includes a second rack 200. A slide base 220 is arranged on the second rack 200. A lifting mechanism is provided on the slide base 220. The lifting mechanism includes an upper mounting plate 231, a lower mounting plate 232, a screw rod 233, a sleeve 234 and a handwheel 235. The screw rod 233 and the sleeve 234 are arranged between the upper mounting plate 231 and the lower mounting plate 232. Both the sleeve 234 and the screw rod 233 are extended through the lens placement platform 210 in a vertical direction, and a gap is provided between the sleeve 234 and the lens placement platform 210. The sleeve 234 is used for restricting the lens placement platform 210 in a horizontal direction in cooperation with the screw rod 233. The handwheel 235 is connected with the screw rod 233. The handwheel 235 can drive the screw rod 233 to rotate, and the screw rod 233 drives the lens placement platform 210 to go up and down.

A computer 240 and a display 250 are further arranged on the second rack 200. The first driving mechanism 130, the second driving mechanism 160 and the lens to be tested are all connected with the computer 240. The computer 240 is used for controlling the rotation of the first driving mechanism 130 and the second driving mechanism 160, controlling the lens to be tested to take images, and calculating the distortion center of the lens to be tested according to the images.

This example further provides a method for calibrating a lens distortion center, which is applied to the aforementioned calibration device, including the following steps.

S1. a lens calibration device is placed in a darkroom, and a lens to be tested is placed on a lens placement platform.

When the test is conducted in the darkroom environment, the environmental reflection is effectively reduced, the stability of the calculation results is ensured, thereby avoiding the influence of ambient light or reflected light of a fixed light source on the calculation results.

S2. the relative position of a calibration plate and the lens to be tested is adjusted through a first driving mechanism and a second driving mechanism, and the lens to be tested is controlled to take images.

Particularly, the first driving mechanism, the second driving mechanism and the lens to be tested are all connected with a computer. The computer controls the rotation of the first driving mechanism and the second driving mechanism, and controls the lens to be tested to take images. Preferably, the computer controls the rotation of the first driving mechanism and the second driving mechanism to adjust the calibration plate to a predetermined position. There are at least three predetermined positions that are stored in the computer. In this example, there are 25 predetermined positions, and 25 images are taken by the lens to be tested. A batch of calibrations can be achieved with high calibration precision and high calibration efficiency.

S3. the distortion center of the lens to be tested is calculated according to the images.

Particularly, the distortion center of the lens to be tested is calculated by matlab or opencv.

In the lens distortion center calibration device of the present invention, the rotating frame is driven to rotate through the first driving mechanism, the calibration plate is arranged in the rotating frame and connected with the rotating frame through the rotating shaft, the second driving mechanism is provided for driving the calibration plate to rotate relative to the rotating frame, and the lens placement platform is arranged at the front end of the calibration plate. The relative position between the calibration plate and the lens can be adjusted through the cooperation of the first driving mechanism and the second driving mechanism, so that a lens can acquire different images to achieve calibration of lens distortion.

The aforementioned embodiments are only preferred embodiments illustrated for fully explaining the present invention and the scope of the present invention is not limited thereto. Equivalent substitutions or variations made by those skilled in the art on the basis of the present invention are both within the scope of the present invention. The scope of the present invention shall be determined by the claims.

What is claimed is:

1. A device for calibrating a lens distortion center comprising:
   a rotating frame,
   a first driving mechanism and
   a second driving mechanism,
   wherein the first driving mechanism is connected with the rotating frame for driving the rotating frame to rotate; a calibration plate is arranged in the rotating frame, and connected with the rotating frame through a rotating shaft; the second driving mechanism is connected with the calibration plate for driving the calibration plate to rotate relative to the rotating frame; and
   a lens placement platform is arranged at a front end of the calibration plate for placing a lens thereon,
   wherein an arc-shaped guide rail is disposed at the bottom of the rotating frame, and the arc-shaped guide rail is slidably connected with the bottom of the rotating frame, the center of the arc-shaped guide rail and the rotating shaft of the rotating frame are collinear, and the first driving mechanism is used for driving the rotating frame to rotate on the arc-shaped guide rail.

2. The lens distortion center calibration device according to claim 1, wherein the calibration plate comprises a checkerboard layer, AR glass and a light source panel, the AR glass is fixed on the light source panel, and the checkerboard layer is laminated on the AR glass.

3. The lens distortion center calibration device according to claim 2, wherein a double-sided adhesive is arranged between the checkerboard layer and the AR glass.

4. The lens distortion center calibration device according to claim 3, wherein the AR glass comprises tempered glass and an AR film plated on the tempered glass.

5. The lens distortion center calibration device according to claim 1, where the device further comprises a lifting mechanism for adjusting the height of the lens placement platform.

6. The lens distortion center calibration device according to claim 5, wherein the lifting mechanism comprises a sleeve, a screw rod and a handwheel, both the sleeve and the screw rod are extended through the lens placement platform in a vertical direction, the handwheel is connected with the screw rod to drive the screw rod to rotate, and the screw rod is used for adjusting the height of the lens placement platform.

7. The lens distortion center calibration device according to claim 1, wherein a slide base is arranged at the bottom of the lens placement platform for adjusting the distance between the lens placement platform and the calibration plate.

8. The lens distortion center calibration device according to claim 1, wherein the first driving mechanism and the second driving mechanism each comprises a rotating motor.

9. A method for calibrating a lens distortion center using the device according to claim 1 comprising steps of:
   placing the device for calibrating a lens distortion center in a darkroom, and placing the lens on the lens placement platform;
   adjusting the relative position of the calibration plate and the lens through the first driving mechanism and the second driving mechanism, and controlling the lens to take an image; and
   calculating the distortion center of the lens according to the image.

* * * * *